Patented July 8, 1941

2,248,438

UNITED STATES PATENT OFFICE 2,248,438

ENOL DERIVATIVES OF CYCLOPENTANO PHENANTHRENE COMPOUNDS AND PROCESS OF MAKING SAME

Leopold Ruzicka, Zurich, and Werner Fischer, Basel, Switzerland, assignors, by mesne assignments, to Ciba Pharmaceutical Products, Incorporated, Summit, N. J., a corporation of New Jersey No Drawing. Application May 12, 1937, Serial No. 142,278. In Switzerland May 18, 1936

17 Claims. (Cl. 260—397.4)

This invention relates to the manufacture of new enol derivatives of cyclopentano phenanthrene compounds, consisting in treating a keto-cyclopentano phenanthrene compound with an acylating agent in presence or absence of an acid binding agent.

Suitable acylating agents are, for example, organic or inorganic acid halides or anhydrides. When an organic acid halide is used an organic ester of the enol or its halide, or both the ester and the halide, can be produced. The ester is advantageously made in an open vessel so that the hydrogen halide which is formed may escape; the halide is chiefly obtained when the reaction occurs in a closed vessel. Thus, for example, by the action of benzoyl chloride on $\Delta^{4,5}$-cholestenone-(3), either the benzoic acid ester of the enol of Formula I or its chloride of Formula II is produced.

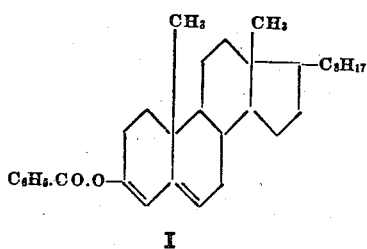

I

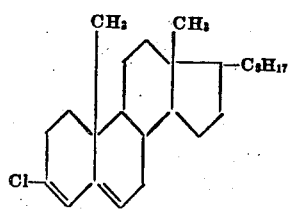

II

The new enol derivatives have therapeutical application or they may serve as intermediate products for making therapeutically active compounds.

The following examples illustrate the invention, the parts being by weight:

Example 1

10 parts of $\Delta^{4,5}$-cholestenone-(3) of the formula

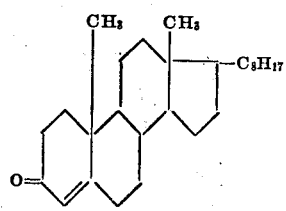

are mixed with 8 parts of benzoyl chloride in 50 parts of pure benzine (boiling point 100° C.) and the mixture is boiled for 40 hours. After distilling as far as possible the benzine and benzoyl chloride in a vacuum, the product is heated on the water bath with ½N-caustic soda solution, then diluted with water and extracted with ether. The ethereal solution is washed with caustic soda solution and water and dried over sodium sulfate. The enol-benzoate of cholestenone is crystallized in part by evaporating the solution; it is stirred with a little acetone to form a magma which is then filtered and washed with cold acetone on the filter until the washings are colorless. There are thus obtained 9.1 parts of the colorless ester of the formula

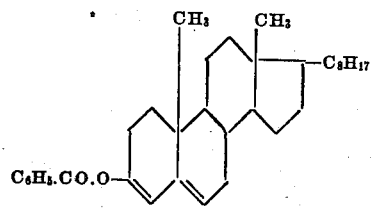

of melting point 116–117° C. From the mother liquor a further quantity may be recovered. With tetranitromethane, the enol-ester yields an intensely red color.

The reaction may be conducted in absence of a solvent, for example by heating cholestenone with benzoyl chloride to 160–170° C. For the purpose of binding the hydrochloric acid produced, there may be added, for example, a tertiary base such a pyridine.

In like manner one can obtain the isomeric benzoic acid enol-ester from Δ¹,²-cholestenone-(3) according to the following equation:

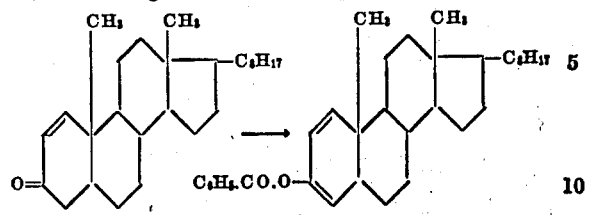

Example 2

10 parts of cholestenone of the formula

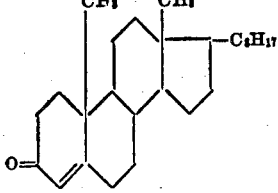

and 50 parts of benzoyl chloride are heated in a bomb tube for 22 hours at 100° C. After distilling the excess of benzoyl chloride in a vacuum, the oily product is heated with ½N-caustic soda solution for 30 minutes on the water bath; it is then diluted with water and extracted with ether. The ethereal solution is shaken with caustic soda solution and water, and dried over sodium sulfate. The oily product crystallizes on addition of a little acetone; 9 parts of the chloride of the enol of the formula

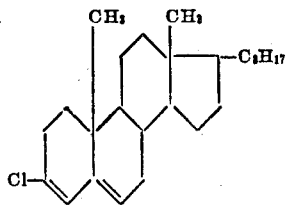

are obtained. In pure condition the compound melts at 61.5°–62.5° C. This new chloride becomes intensely yellow-brown on addition of tetranitromethane.

Example 3

2 parts of cholestanone of the formula.

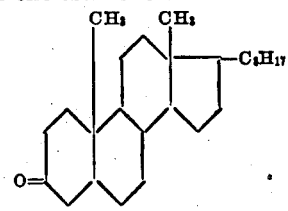

and 10 parts of acetyl chloride are heated together in a bomb tube for 16 hours at 100° C. The contents of the tube are then poured into water and the product of the reaction is extracted from the aqueous liquid by means of ether; the ethereal solution is washed with caustic soda solution and water and dried over sodium sulfate. The oil obtained by evaporating the solvent yields no semicarbazone and crystallizes after long standing. The simple unsaturated chloride thus obtained of the formula

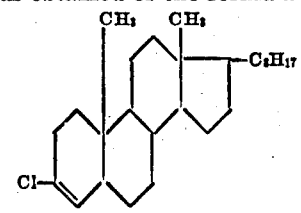

may be recrystallized from acetone, a mixture of alcohol and hexane or a mixture of alcohol and benzene. It melts at 81° C. and yields with tertanitromethane a pronounced yellow color.

Example 4

10 parts of Δ⁴,⁵-androstene-dione-(3,17) of the formula

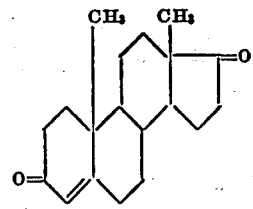

are mixed with 16.5 parts of benzoyl chloride in 400 parts of pure benzine (boiling point 100° C.) and the mixture is boiled for 40 hours. On cooling to room temperature, the new ester of the formula

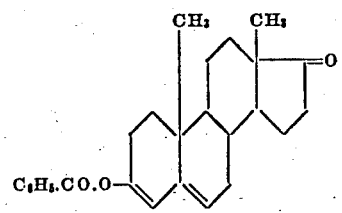

separates in the form of beautifully formed crystals. It is filtered and washed with cold benzine. The compound sinters at 168° C. and melts with decomposition between 176° and 180° C. The fine, colorless needles yield with tetranitromethane a pronounced yellow-brown color.

The yield of the enol-ester amounts to about 70 per cent. and analysis shows that it is a mono-ester of androstene-dione enolized in 3-position.

Example 5

According to the procedure described in Example 1 there are obtained from 20 parts of cholestanone of the formula

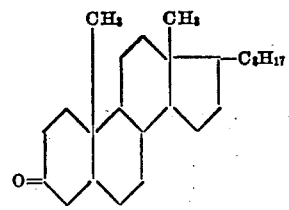

and 16 parts of benzoyl chloride 21.5 parts of the enol-benzoate of cholestanone of the formula

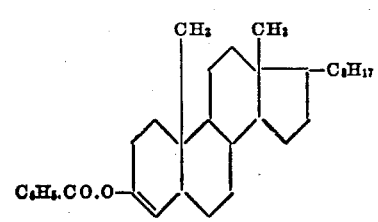

which after recrystallization from acetone melts at 127–128° C.

Example 6

A mixture of 0.2 part of Δ⁴·⁵-androstene-dione-(3,17) of the formula

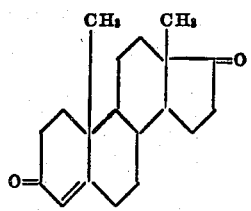

7 parts of acetic anhydride and 0.2 part of freshly fused potassium acetate is heated to boiling for 45 hours. Then the contents of the vessel are poured into water and the reaction product is extracted with ether. The ethereal solution is washed with dilute sodium carbonate solution, then with caustic alkali solution and with water, dried by means of sodium sulfate and the solvent is then evaporated. There remains a mixture which partly crystallizes and can be filtered on the addition of a small quantity of methanol. The product is then dissolved in methanol and the fraction which first separates, being not quite pure, is removed. After concentrating the solution and cooling it for a long time at —10° C. beautiful needles of the enol-monoacetate of Δ⁴·⁵-androstene-dione-(3,17) of the formula

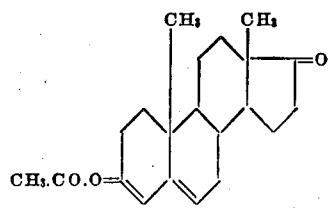

separate. The product can be recrystallized from methanol; it melts at 127–129° C. and gives a yellow-brown color with tetra-nitromethane.

Example 7

A mixture of 0.256 part of testosterone-benzoate of the formula

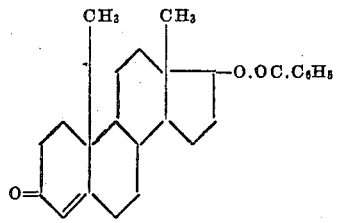

2.3 parts of benzoyl chloride and 12.5 parts of benzine is heated to boiling for about 44 hours. After removing the benzine and benzoyl chloride by filtering the enol-benzoate of testosterone-17-benzoate of the formula

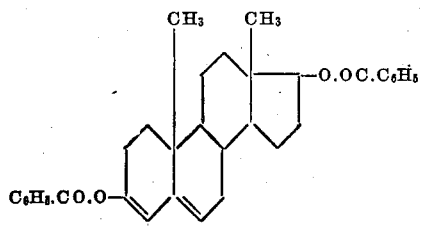

crystallizes; it can be obtained pure by rubbing with acetone and melts at 183–184° C. with decomposition.

Example 8

A mixture of 0.1 part of testosterone of the formula

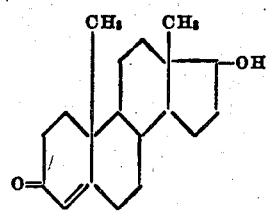

3.5 parts of acetic anhydride and 0.2 part of freshly fused potassium acetate is heated to boiling for about 42 hours and the reaction mixture is then poured into water and the product is extracted with ether. After the ethereal extract has been washed with dilute sodium carbonate solution, dilute caustic alkali solution and water it is dried by means of sodium sulfate and the solvent is evaporated. The residue of the distillation is stirred with acetone and filtered. The product so obtained, namely the enol-acetate of testosterone-17-acetate of the formula

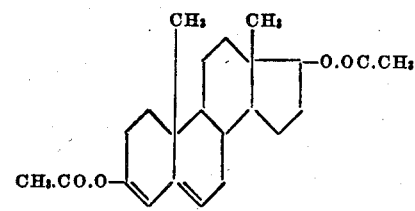

melts at 150–151° C. and can be recrystallized from alcohol. It gives a pronounced brown color with tetranitromethane.

In a similar manner by heating cholestenone with acetic anhydride in presence or absence of a solvent until the reaction is finished there is obtained the enol-acetate of cholestenone of melting point 78° C. It gives a brown color with tetranitromethane and can be recrystallized from a mixture of acetone and alcohol.

Instead of acetic anhydride there may be used an acetic acid halide such as acetyl chloride or acetyl bromide. It is also possible to use as the acylating agent a ketene such as ketene itself.

Example 9

A mixture of 0.2 part of testosterone-propionate of the formula

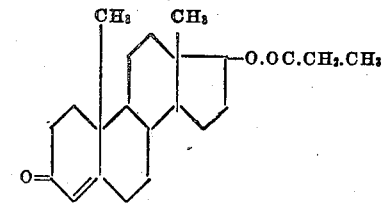

0.4 part of anhydrous sodium acetate and 7 parts of acetic anhydride is heated to boiling for 41 hours and the reaction mixture is worked up in the manner indicated in the foregoing examples. There is obtained the 3-enol-acetate of testosterone-17-propionate of the formula

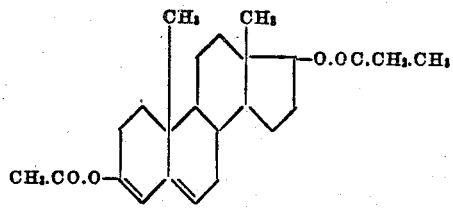

which melts at 140–141° C. and gives a brown color with tetranitromethane.

In a similar manner the 3-enol-propionate of testosterone-17-acetate can be obtained from testosterone-acetate. After recrystallization from methanol it melts at 139.5–141° C. and produces a strong melting point depression both with testosterone-17-acetate and also with testosterone-3-enolacetate-17-propionate.

*Example 10*

A mixture of 0.1 part of testosterone of the formula

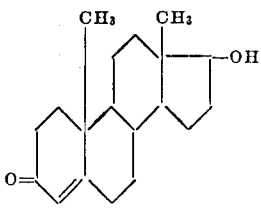

(or testosterone-17-propionate) 0.2 part of sodium propionate and 4 parts of propionic anhydride is heated to boiling in a reflux apparatus for about 5 hours. By working up the reaction mixture in the matter indicated in Example 8 there is obtained the 3-enol-propionate of testosterone-17-propionate of the formula

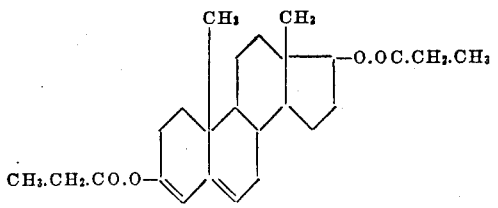

which melts at 125–127° C. It gives a brown color with tetranitromethane and a mixture with testosterone-17-propionate shows a depression in melting point.

In an analogous manner there can also be prepared normal or mixed diesters of testosterone with other acids, for example formic acid, n-butyric acid, iso-butyric acid, valeric acid or palmitic acid.

Corresponding enol-esters can be obtained for example from androstane-dione-(3,17), androstane-ol-(17)-one-(3), $\Delta^{1,2}$-androstene-dione, $\Delta^{1,2}$-chloestenone, $\Delta^{1,2}$-androstene-ol-(17)-one-(3) or derivatives thereof.

*Example 11*

A mixture of 0.1 part of progesterone of the formula

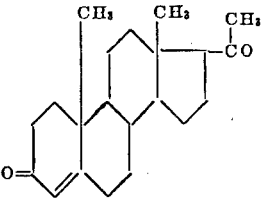

0.2 part of anhydrous sodium acetate and 3.5 parts of acetic anhydride is heated to boiling for 40 hours. By working up the reaction mixture in the manner described in the foregoing examples there is obtained the 3-enol-acetate of progesterone of the formula

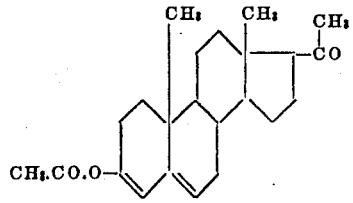

which melts at 135–136.5° C. and gives a brown color with tetranitromethane.

*Example 12*

A mixture of 0.1 part of progesterone of the formula

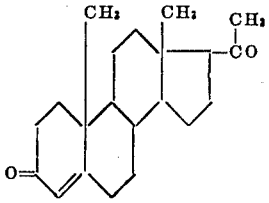

0.2 part of anhydrous sodium propionate and 5 parts of propionic anhydride is heated to boiling in a reflux apparatus for 5 hours. The 3-enol-propionate of progesterone of the formula

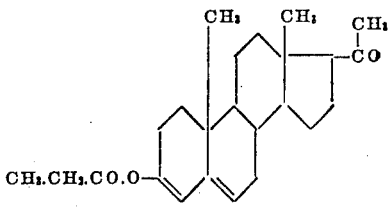

thus obtained is recrystallized from methanol and melts at 134–136° C. With tetranitromethane it gives an intense brown color and a mixture with progesterone shows a depression in melting point.

In a similar manner other enol-esters of progesterone can be prepared, for example the butyrates, valerates, stearate or benzoate.

In an analogous manner also compounds of the series of the hormones of the suprarenal cortex, for example the cortical hormone itself, 21-oxyprogesterone and esters thereof, can be converted into their enol derivatives such as acetates, propionates, acetate-propionates and the like.

What we claim is:

1. Process for the manufacture of new enol derivatives of 3-keto-cyclopentano-10, 13-dimethyl-phenanthrene, comprising heating a 3-keto-cyclopentano-10, 13-dimethyl phenanthrene compound with an acylating agent at a temperature of at least about 100° C. for a sufficient time to form an enol derivative which is acylated at the enolic hydroxy group.

2. Process for the manufacture of new enol derivatives of 3-keto-cyclopentano-10, 13-dimethyl-phenanthrene, comprising heating a compound of the formula

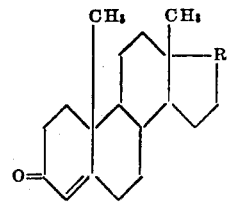

wherein R is a member of the group consisting of

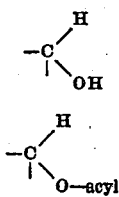

and

with an acylating agent at a temperature of at least about 100° C. for a sufficient time to form an enol derivative which is acylated at the enolic hydroxy group.

3. Process for the manufacture of new enol derivatives of 3-keto-cyclopentano-10, 13-dimethyl-phenanthrene, comprising heating a compound of the formula

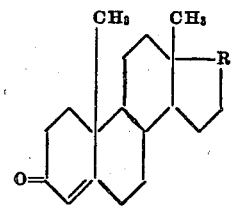

wherein R is a member of the group consisting of

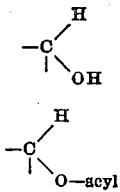

and

with an aliphatic acylating agent at a temperature of at least about 100° C. for a sufficient time to form an enol derivative which is acylated at the enolic hydroxy group.

4. Process for the manufacture of new enol derivatives of 3-keto-cyclopentano-10, 13-dimethyl-phenanthrene, comprising heating a compound of the formula

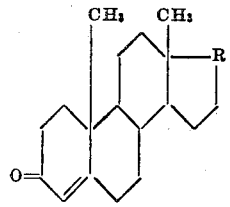

wherein R is a member of the group consisting of

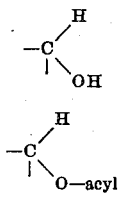

and

with an aliphatic acid anhydride at a temperature of at least about 100° C. for a sufficient time to form an enol derivative which is acylated at the enolic hydroxy group.

5. Process for the manufacture of new enol derivatives of 3-keto-cyclopentano-10, 13-dimenthyl-phenanthrene, comprising heating a compound of the formula

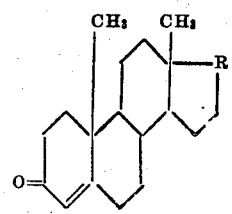

wherein R is a member of the group consisting of

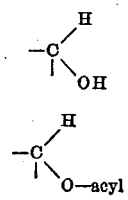

and

with an aliphatic acid anhydride in the presence of an anhydrous salt of such an acid at a temperature of at least about 100° C. for a sufficient time to form an enol derivative which is acylated at the enolic hydroxy group.

6. Process for the manufacture of the enol propionate of testosterone-17-propionate, comprising treating a member of the group consisting of testosterone and testosterone-17-propionate with propionic acid anhydride in the presence of a propionic acid salt at a temperature of at least about 100° C. for a sufficient time to form an enol derivative which is acylated at the enolic hydroxy group.

7. Process for the manufacture of new enol derivatives of 3-keto-cyclopentano-10, 13-dimethyl-phenanthrene, comprising heating progesterone with an acylating agent at a temperature of at least about 100° C. for a sufficient time to form an enol derivative which is acylated at the enolic hydroxy group.

8. Process for the manufacture of new enol derivatives of 3 - keto - cyclopentano-10,13-dimethyl-phenanthrene, comprising heating progesterone with an aliphatic acylating agent at a temperature of at least about 100° C. for a sufficient time to form an enol derivative which is acylated at the enolic hydroxy group.

9. Process for the manufacture of new enol derivatives of 3 - keto - cyclopentano-10,13-dimethyl-phenanthrene, comprising heating progesterone with an aliphatic acid anhydride at a temperature of at least about 100° C. for a sufficient time to form an enol derivative which is acylated at the enolic hydroxy group.

10. Process for the manufacture of new enol derivatives of 3 - keto - cyclopentano-10,13-dimethyl-phenanthrene, comprising heating progesterone with an aliphatic acid anhydride in the presence of an anhydrous salt of such acid at a temperature of at least about 100° C. for a sufficient time to form an enol derivative which is acylated at the enolic hydroxy group.

11. The enol esters of the 3-keto-cyclopentano-10,13-dimethyl phenanthrene compounds.

12. The enol esters of $\Delta^{4,5}$-unsaturated 3-keto-cyclopentano-10,13-dimethyl phenanthrene compounds.

13. The enol esters of a member of the group consisting of testosterone, testosterone-17-esters and progesterone.

14. The enol propionate of testosterone-17-propionate of the formula

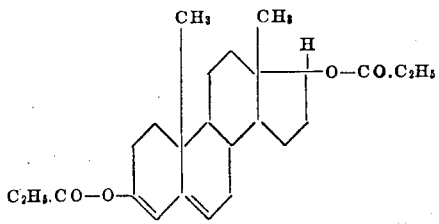

15. The enol acetate of testosterone-17-propionate of the formula

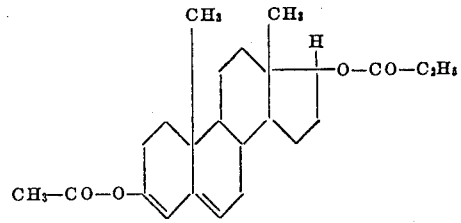

16. The method of producing a more highly nuclearly unsaturated derivative of cholestenone which comprises reacting cholestenone with acetic anhydride in the presence of an anhydrous salt of acetic acid.

17. The enol esters of unsaturated 3-keto-cyclopentano-10,13-dimethyl phenanthrene compounds.

LEOPOLD RUZICKA.
WERNER FISCHER.